United States Patent
Zaveri et al.

(10) Patent No.: US 9,208,153 B1
(45) Date of Patent: Dec. 8, 2015

(54) FILTERING RELEVANT EVENT NOTIFICATIONS IN A FILE SHARING AND COLLABORATION ENVIRONMENT

(71) Applicant: Symantec Corporation, Mountain View, CA (US)

(72) Inventors: Ameet Zaveri, Pleasanton, CA (US); Walter Bogorad, Danville, CA (US)

(73) Assignee: Symantec Corporation, Mountain View, CA (US)

( * ) Notice: Subject to any disclaimer, the term of this patent is extended or adjusted under 35 U.S.C. 154(b) by 187 days.

(21) Appl. No.: 14/105,446

(22) Filed: Dec. 13, 2013

(51) Int. Cl.
*G06F 17/30* (2006.01)

(52) U.S. Cl.
CPC .... *G06F 17/30011* (2013.01); *G06F 17/30029* (2013.01); *G06F 17/30035* (2013.01); *G06F 17/30699* (2013.01); *G06F 17/30828* (2013.01)

(58) Field of Classification Search
USPC .................................. 707/608, 737, 754, 767
See application file for complete search history.

(56) References Cited

U.S. PATENT DOCUMENTS

| | | | |
|---|---|---|---|
| 5,583,763 A * | 12/1996 | Atcheson et al. | 707/750 |
| 8,612,470 B1 * | 12/2013 | Fushman et al. | 707/767 |
| 8,825,853 B1 * | 9/2014 | Konig et al. | 709/224 |
| 2003/0225777 A1 * | 12/2003 | Marsh | 707/101 |
| 2004/0167864 A1 * | 8/2004 | Wang et al. | 707/1 |
| 2008/0059422 A1 * | 3/2008 | Tenni et al. | 707/3 |
| 2011/0191311 A1 * | 8/2011 | Polonsky et al. | 707/706 |
| 2012/0096041 A1 * | 4/2012 | Rao et al. | 707/794 |
| 2013/0159325 A1 * | 6/2013 | Polonsky et al. | 707/754 |

* cited by examiner

*Primary Examiner* — Cam-Linh Nguyen
(74) *Attorney, Agent, or Firm* — Brill Law Office; Jeffrey Brill

(57) ABSTRACT

Profile information is maintained concerning users and files in the context of a file sharing and collaboration environment. Profile information quantifies each user's interest level in specific files, and levels of similarity between users and between files. Machine learning techniques are applied to monitored actions taken by users directed towards files, and profile information is dynamically updated in response. Natural language processing such as n-gram analysis is applied to files, and file similarity levels are increased in response to requisite amounts of common content. The event notification stream is filtered. For each specific event notification, a relevance value is quantified for each specific user, based on profile information concerning the specific user, the file to which the event is directed, and the user who undertook the event. The corresponding notification is only transmitted to specific users for whom the relevance value exceeds a predetermined threshold.

20 Claims, 4 Drawing Sheets

FILTERING RELEVANT EVENT NOTIFICATIONS IN A FILE SHARING AND COLLABORATION ENVIRONMENT

TECHNICAL FIELD

This disclosure pertains generally to multi-user collaboration on shared computer data, and more specifically to filtering relevant event notifications in a file sharing and collaboration environment.

BACKGROUND

It is desirable for groups of users to have shared, collaborative access to documents and other files in an enterprise or other multi-user environment. A number of platforms support document collaboration. One example is Google Docs, which is a cloud based suite of programs that allows users to create, edit and store documents online, and to collaborate with other users. Google Docs currently includes a word processor, spreadsheet program, drawing program and form creator. A user can view and edit his or her documents from any computer with an Internet connection. The owner of a document can also give other users viewing or editing rights. Documents can be shared, opened, and edited by multiple users simultaneously. Documents are automatically saved to servers in the cloud, and a revision history is kept so that past edits may be viewed and previous versions of documents can be accessed. Documents can also be tagged and archived for organizational purposes. Users can be notified of edits, comments, replies and discussions concerning documents.

Various programs support sharing of different types of files in various contexts. Some other examples of such software include SharePoint, XaitPorter, SkyDrive and Drop Box. Although the exact functionality can vary between products, collaboration software typically supports features such as allowing multiple users to work on a single document at the same time from multiple computers, indicating when other users are active on documents, allowing users to set access permissions for their documents, allowing users to tag documents, allowing users to make and reply to content specific comments, maintaining a revision history and providing users with notifications of activity events concerning shared documents.

The underlying implementation architectures and operating environments used in file sharing and collaboration systems can vary between products. Typically, some form of shared storage architecture with supporting software (e.g., volume management, cluster management, cluster/parallel/distributed file system, sync service, etc.) is utilized, either "in the cloud" or on an organization's private network, with transparent network based access for users.

In file sharing and document collaboration systems, users often want current information indicating what activities occur concerning files which they have created, edited, or in which they otherwise have an interest. As noted above, collaboration systems can stream notifications of activity events to users. However, in a collaborative environment, particularly one in which a large number of documents are shared, so many activity events can occur so frequently that users become completely overwhelmed with notifications. When this occurs, users tend to ignore all received notifications, making the streaming of activity event notifications virtually useless. Some systems allow users to specify for which files they would like to receive event notifications. However, even where users limit their feeds to files or projects on which they are active, the frequency and number of notifications still tends to be very high. Users sometimes adjust their settings in an attempt to receive only desired notifications, but because of limited knowledge on the part of the users as well as the sheer extent of file activity in a collaboration environment, users can end up making frequent manual tweaks to their settings and still be overwhelmed with streamed notifications. This problem exists in both enterprise and consumer settings, but in enterprise it is more severe because the volumes of files tend to be larger, and documents tend to be shared more.

It would be desirable to address these issues.

SUMMARY

Multiple users collaboratively view, modify and comment on a shared set of files in the context of a file sharing and collaboration environment. The resulting event notification stream is filtered based on the relevance of specific notifications to specific target users, thereby preventing users from being overwhelmed with notifications of events in which they have little or no interest. Dynamic and static profile information is maintained concerning each user of the file sharing and collaboration environment. The user profile information describes each user, and quantifies each user's interest level in specific files, specific types of files and specific file content of the shared data set. The user profile information also quantifies levels of similarity between users, and between user types.

Actions taken by specific users directed towards files of the shared set and towards received notifications of events of the file sharing and collaboration environment are monitored. Machine learning techniques are applied to the monitored actions, and in response user profile information is dynamically updated. More specifically, the quantification of a first user's interest level in a specific file, in a specific type of file, in specific file content or in a specific event is increased, based on a second user taking an action indicative of interest therein, provided that the quantification of the similarity of the users exceeds a given threshold value. Likewise, the quantification of the first user's interest level is decreased if the second user takes an action indicative of a lack of interest. Quantification of similarity levels between users can be increased in response to different users each separately taking actions indicative of interest in a common specific file, in a common specific file type, in common specific file content or in a common specific event.

Profile information concerning each file of the shared set is also maintained. The file profile information concerning a specific file describes each file, and quantifies levels of similarity between specific files, specific types of files and specific file content. Natural language processing can be applied to files in the shared set, and a quantification of a first file's similarity level to a second file can be increased in response to the applied natural language processing indicating that the files have a requisite amount of common content (e.g., content in a body of a file and/or in a comment made concerning the file). In one embodiment, the natural language processing is in the form of n-gram analysis performed on content of the files. In this embodiment, the similarity level is increased in response to a requisite number of common n-grams occurring in both files with a requisite frequency. The quantification of a first file's similarity level to a second file can also be increased responsive to both files having a requisite amount of common metadata.

The event notification stream of the file sharing and collaboration environment is filtered. The event notification stream comprises a plurality of notifications, each one of which describes an event undertaken by a user and directed towards a file. For each specific event notification in the filtered stream, a relevance value is quantified for each specific one of the multiple users, based on user profile information concerning the specific user, file profile information concerning the file to which the event is directed, and user profile information concerning the user who undertook the event. A notification describing a specific event is only transmitted to those specific users for whom the relevance value exceeds a predetermined threshold value, thereby preventing saturation of users with notifications of events in which they are not interested.

Quantifying the relevance value of an event notification for a specific user can take the form of adjusting the relevance value in proportion to a quantification, in the user profile information, of the similarity level of 1) the target user or a user type of the target user to 2) the user who undertook the event or a user type of the user who undertook the event. The relevance value of an event notification for a target user can also be adjusted in proportion to a quantification, in the user profile information concerning the target user, of the target user's interest level in the file to which the event is directed, in a file type of the file to which the event is directed or in content of the file to which the event is directed. In this context the file content can be in the form of content in the body of the file, content in a modification made to the file by a user, content in a comment made by a user concerning the file and/or metadata of the file.

In addition, a general relevance value for each one of the multiple users can be maintained. A general relevance value for a user quantifies an interest level of other users in events undertaken by the specific user. In order to set the general relevance value for a specific user, actions taken by users directed towards received notifications of events undertaken by the specific user, towards file content added to files of the shared set by the specific user and to comments made concerning files of the shared set by the specific user are monitored. The general relevance value of the specific user is dynamically modified in response to monitored actions (i.e., increased in response to a monitored action indicating interest and decreased in response to a monitored action indicating a lack of interest). In embodiments in which general relevance values for users are maintained, the relevance value of an event notification for a target user can be adjusted in proportion to the general relevance value of the user who undertook the event.

In some embodiments, a general relevance value for each file of the shared set can also be maintained. A general relevance value for a specific file quantifies an interest level of users in events targeting the specific file. Various actions taken by users can be monitored, e.g., those actions directed towards received notifications of events targeting the specific file, towards file content of the specific file, towards file content added to the specific file and towards comments made by users concerning the specific file. The general relevance value of the specific file can then be dynamically adjusted in response to monitored actions (i.e., increased in response to a monitored action indicating interest and decreased in response to a monitored action indicating a lack of interest). In such embodiments, relevance values of an event notification for target users are adjusted in proportion to the general relevance value of the file targeted by the event.

In some embodiments, quantifying a relevance value of a specific event notification can further comprise determining a general relevance value for the specific event. A general relevance value for a specific event quantifies an interest level of users in the specific event based on factors such as the type of the event, the time of the event, the target file of the event, the user who undertook the event and comments made by users concerning the event. The general relevance value for a specific event can also be adjusted by parsing content added to a target file during the course of the specific event or content entered as a comment concerning the target file during the course of the specific event. Natural language processing can be applied to the file content, and a substantiality level of the file content can be quantified in response to the results of the applied natural language processing. The general relevance value of the specific event can then be adjusted in proportion to the quantified substantiality level of the file content, reflecting the fact that substantive edits or comments are generally considered more relevant than minor ones. The relevance value of the specific event notification for target users can then be adjusted in proportion to the general relevance value of the specific event.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
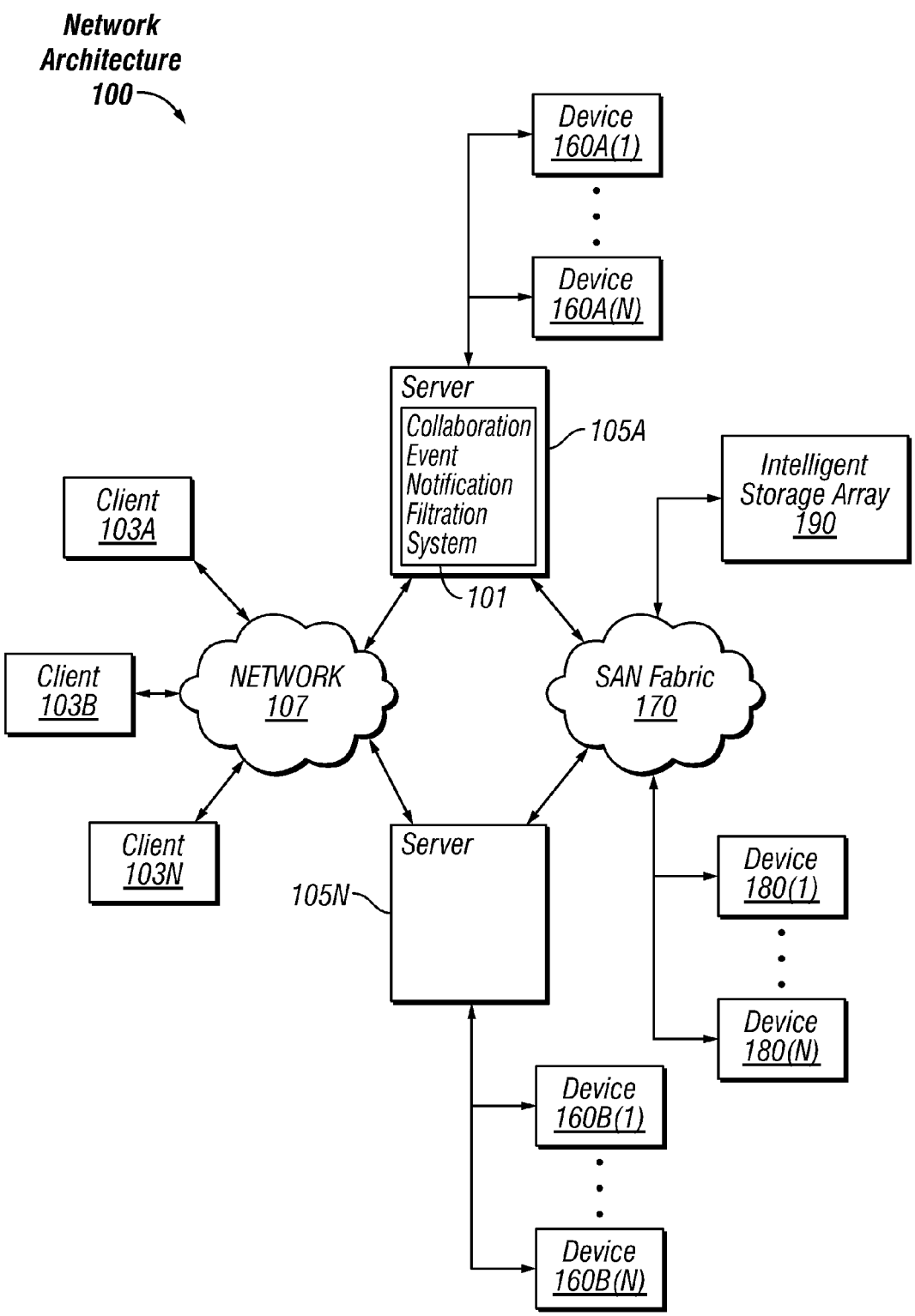
FIG. 1 is a block diagram of an exemplary network architecture in which a collaboration event notification filtration system can be implemented, according to some embodiments.

FIG. 1 is a block diagram illustrating an exemplary network architecture 100 in which a collaboration event notification filtration system 101 can be implemented. In the illustrated network architecture 100, client systems 103A, 103B and 103N, as well as servers 105A and 105N, are communicatively coupled to a network 107. A collaboration event notification filtration system 101 is illustrated as residing on server 105A, but in other embodiments the collaboration event notification filtration system 101 can be distributed between multiple computers 210 as desired. In FIG. 1, server 105A is further depicted as having storage devices 160A(1)-(N) directly attached, and server 105N is depicted with storage devices 160B(1)-(N) directly attached. Servers 105A and 105N are also connected to a SAN fabric 170 which supports access to storage devices 180(1)-(N) by servers 105A and 105N, and so by client systems 103A-N via network 107.

Intelligent storage array 190 is also shown as an example of a specific storage device accessible via SAN fabric 170. In other embodiments, shared storage is implemented using FC and iSCSI (not illustrated) instead of (or in combination with) a SAN fabric 170.

Many different networking technologies can be used to provide connectivity from each of client computer systems 103A-N to network 107. Some examples include: LAN, WAN and various wireless technologies. Client systems 103A-N are able to access applications and/or data on server 105A or 105N using, for example, a web browser or other client software (not shown). This enables client systems 103A-N to run applications from an application server 105 and/or to access data hosted by a storage server 105 or one of storage devices 160A(1)-(N), 160B(1)-(N), 180(1)-(N) or intelligent storage array 190. Clients 103 can be in the form of, for example, desktop computers, laptop computers, or mobile computing devices, comprising portable computer systems capable of connecting to a network 107 and running applications. Such mobile computing devices are sometimes referred to as smartphones, although some mobile phones not so designated also have these capabilities. Tablet computers are another example of mobile computing devices.

Although FIG. 1 illustrates three clients 103A-N and two servers 105A-N as an example, in practice many more (or fewer) computers can be deployed. In one embodiment, the network 107 is in the form of the internet. Other networks 107 or network-based environments can be used in other embodiments.

Figure 2:
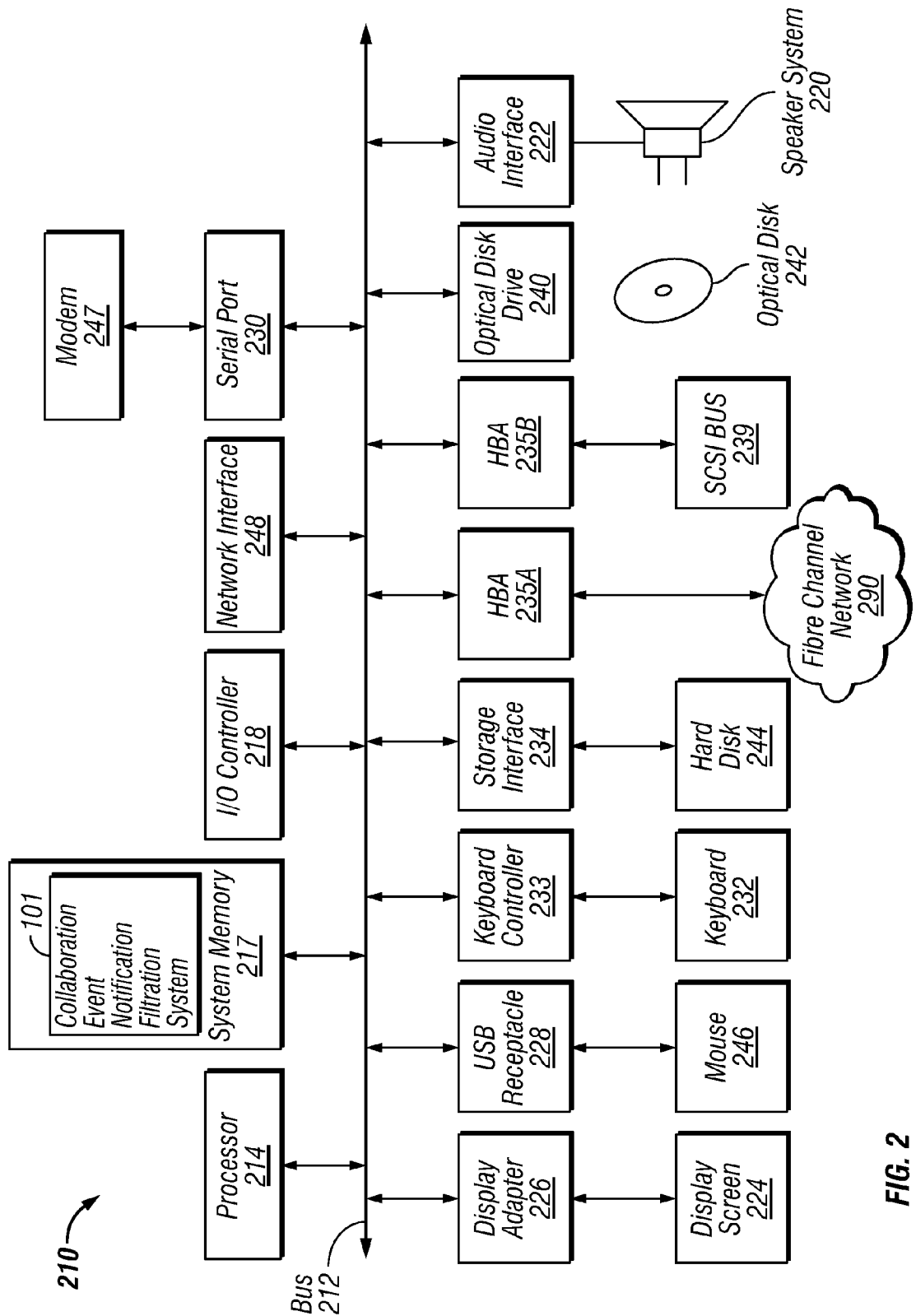
FIG. 2 is a block diagram of a computer system suitable for implementing a collaboration event notification filtration system, according to some embodiments.

FIG. 2 is a block diagram of a computer system 210 suitable for implementing a collaboration event notification filtration system 101. Both clients 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an audio output device such as a speaker 220, a display adapter 226 communicatively coupled to a video output device such as a display screen 224, one or more interfaces such as Universal Serial Bus (USB) receptacles 228, serial ports 230, parallel ports (not illustrated), etc., a keyboard controller 233 communicatively coupled to a keyboard 232, a storage interface 234 communicatively coupled to one or more hard disk(s) 244 (or other form(s) of storage media), a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212, e.g., via a USB receptacle 228, a modem 247 coupled to bus 212, e.g., via a serial port 230, and one or more wired and/or wireless network interface(s) 248 coupled, e.g., directly to bus 212.

Other components (not illustrated) may be connected in a similar manner (e.g., document scanners, digital cameras, printers, etc.). Conversely, all of the components illustrated in FIG. 2 need not be present (e.g., smartphones and tablets typically do not have optical disk drives 240, external keyboards 242 or external pointing devices 246, although various external components can be coupled to mobile computing devices via, e.g., USB receptacles 228). The various components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the collaboration event notification filtration system 101 is illustrated as residing in system memory 217. The workings of the collaboration event notification filtration system 101 are explained in greater detail below in conjunction with FIGS. 3.

The storage interface 234 is coupled to one or more hard disks 244 (and/or other standard storage media). The hard disk(s) 244 may be a part of computer system 210, or may be physically separate and accessed through other interface systems.

The network interface 248 and/or modem 247 can be directly or indirectly communicatively coupled to a network 107 such as the internet. Such coupling can be wired or wireless.

Figure 3:
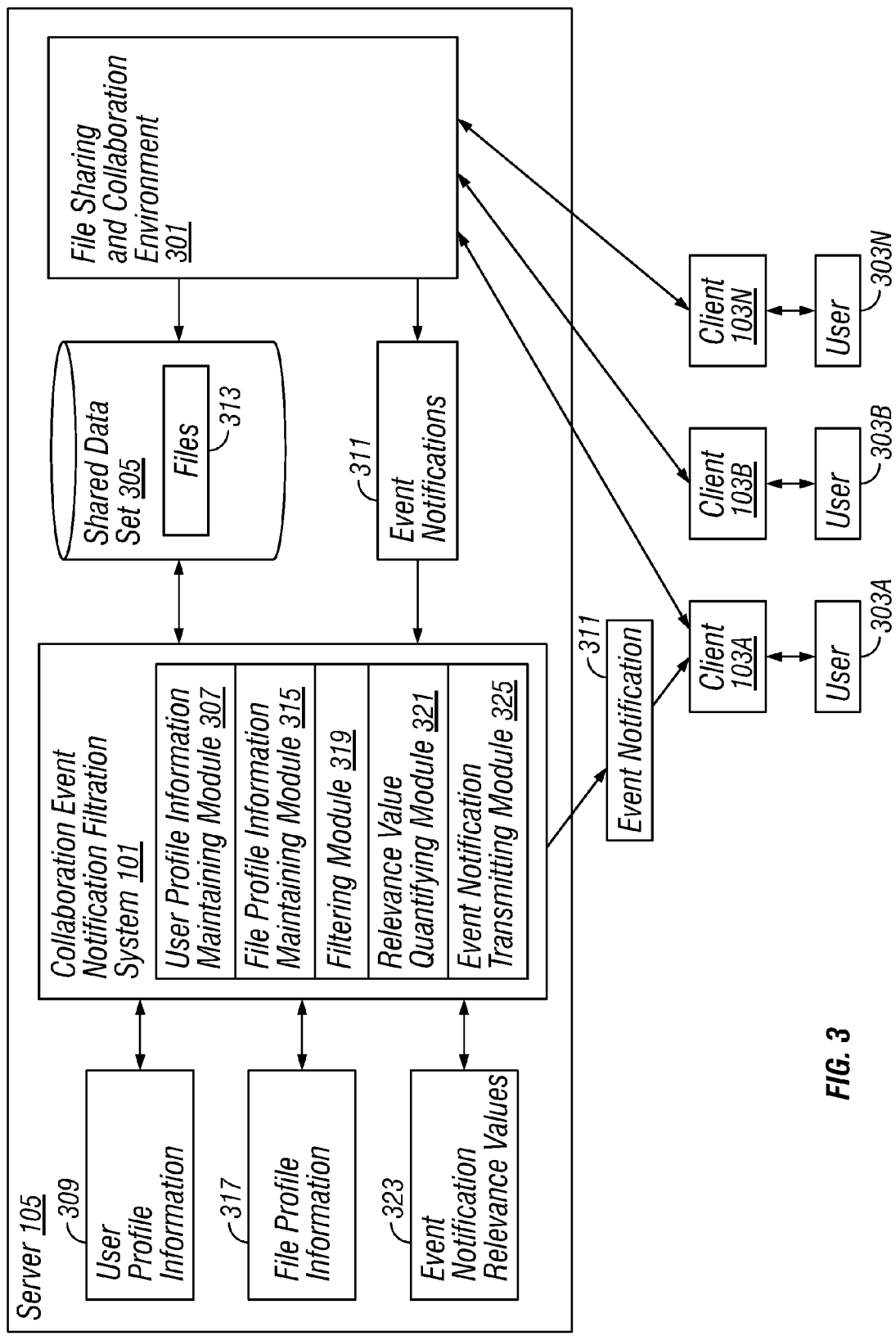
FIG. 3 is a block diagram of the operation of a collaboration event notification filtration system, according to some embodiments.

FIG. 3 illustrates the operation of a collaboration event notification filtration system, according to some embodiments. As described above, the functionalities of the collaboration event notification filtration system 101 can reside on a client 103, a server 105, or be distributed between multiple computer systems 210, including within a cloud-based computing environment in which the functionality of the collaboration event notification filtration system 101 is provided as a service over a network 107. It is to be understood that although the collaboration event notification filtration system 101 is illustrated in FIG. 3 as a single entity, the illustrated collaboration event notification filtration system 101 represents a collection of functionalities, which can be instantiated as a single or multiple modules as desired (an instantiation of a specific, multiple module collaboration event notification filtration system 101 is illustrated in FIG. 3). It is to be understood that the modules of the collaboration event notification filtration system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the collaboration event notification filtration system 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

As illustrated in FIG. 3, the collaboration event notification filtration system 101 works in conjunction with a file sharing and collaboration environment 301, in which multiple users 303 can collaborate on a shared set 305 of files 313. The collaboration event notification filtration system 101 automatically filters relevant event notifications 311 in the event notification stream for specific users 303 based on relevance. By only transmitting notifications 311 of interest to specific users 303, the received event notification 311 stream of the file sharing and collaboration environment 301 is prevented from being overly voluminous and hence unusable. The filtering is done based on profile information concerning the target user 303, the user who undertook the event 303 and the file 313 to which the event is directed. Machine learning techniques are utilized to dynamically update user profile information 309, based on actions taken by the users 303 themselves as well as similar users 303, within the file sharing and collaboration environment 301. Natural language processing techniques are applied to file content, including the content of revisions and comments, in order to dynamically maintain profile information 317 concerning the files 313 of the shared set 305, including similarity between files 313, file types and file content, as well as substantiality of revisions and comments. All of this dynamically maintained information can be used as input to improve filtering results.

As illustrated in FIG. 3, a collaboration event notification filtration system 101 runs on a server computer 105 in conjunction with a file sharing and collaboration environment 301. Although in FIG. 3, the collaboration event notification filtration system 101 and the file sharing and collaboration environment 301 are illustrated as separate entities, in some embodiments some or all of the functionality of one of these systems is provided as part of the other. The server 105 is connected to multiple computers 210 via a network 107, which can be in the form of the internet, an enterprise level wide area network, a local area network at a small business or even home level, etc. In FIG. 3, three separate users 303 each operating a separate client computer 103 are illustrated, although many more users 303 can interact with a collaboration event notification filtration system 101 in practice.

As the term is used herein, an "enterprise network" 107 means a network 107 maintained by any type of organization (e.g., a corporation, a university, a government department, a municipality, a civic organization, etc.). Thus, as the word "enterprise" is used herein, the term encompasses not only corporations and other business organizations, but public sector and non-commercial organizations as well. Corporations, governments, universities and not-for-profit organizations are all examples of enterprises. Typically an enterprise stores proprietary or other private data on its network 107, and access to the network 107 is restricted according to policies set by an administrator.

Utilizing the functionality of the file sharing and collaboration environment 301, multiple users 303 collaboratively access a shared data set 305, which can include files 313 in various formats (e.g., word processing documents, spreadsheets, slide presentations, image files, digital photographs, video or audio, etc.). The file sharing and collaboration environment 301 supports features such as viewing and editing of files by multiple users 303, maintaining a revision history, file tagging, commenting on documents and edits made thereto, and providing event notifications 311 to users 303. The shared data set 305 is illustrated in FIG. 3 as residing on server 105, but in practice can be located on one or more storage devices located anywhere in the network 107 accessible to the collaboration event notification filtration system 101 and the file sharing and collaboration environment 301.

A user profile information maintaining module 307 of the collaboration event notification filtration system 101 maintains both static and dynamic user profile information 309 concerning each one of the multiple users 303 with access to the shared data set 305. Generally, a user's static profile information $309_{static}$ identifies and describes the user 303, and includes information such as name and/or other identifier (e.g., a user id), geo-location, position within the enterprise (e.g., job title), group(s) within the enterprise of which the user is a member, etc. The specific static user profile information $309_{static}$ maintained can vary between embodiments. This profile information $309_{static}$ is static in the sense that it is not automatically updated based on monitored actions targeting files 313 of the shared set 305, as described in detail below concerning dynamic user profile information $309_{dynamic}$. However, static user profile information 309 static can be updated (e.g., by an administrator or in some cases by the user 303) when the user's circumstances change, for example if the user 303 is promoted or otherwise changes jobs within the organization, transfers to an office in a different city, etc.

A user's dynamic profile information $309_{dynamic}$ includes the user's interest level in specific instances and types of data in the shared set 305, which is used in selectively filtering event notifications 311 as described in detail below. The user's interest level in data in the shared set 305 can be quantified at different levels of granularity, such as specific files 305 (e.g., a particular document or spreadsheet), specific file types (e.g., files 313 that are part of a given project, files 313 in a specific format, files 313 with a given tag, files 313 created, read, edited and/or commented on by a specific user 303, by any user 303 in a specific group, after a specific time, etc.) and specific file content. File content as used herein includes not only text and other content in the body of a file 313, but also content in specific subsections of a file 313, in comments made by users concerning a file 313, in edits made to a file 313, etc. The specific levels at which to track and quantify user interest in specific files 313 (and file types and file content) can vary between embodiments as desired.

The format of the user profile information 309 used to quantify a user's interest level in a given unit of shared 305 (e.g., a file 305, file type or file content) is a variable design parameter. Generally, a numerical rating can be maintained which can be adjusted up and down to indicate more or less interest as appropriate. In one embodiment, interest levels are initialized to a default quantification value which can then be modified as indicative actions are monitored.

Also maintained as part of a user's dynamic profile information $309_{dynamic}$ are quantifications of levels of similarity between the user 303 and other users 303 (and/or types of users 303) who collaborate on the shared data set 305. The quantified similarities can be thought of as a user-to-user similarity matrix, and it is maintained for all of the multiple users 303 with access to the shared data set 305 and updated dynamically based on monitored user activity as described below. A level of similarity between specific users 303 (or user types) can also be adjusted up (or down) based on specific similarities (or distinctions) in their profile information 309, such as job title, location, active projects, relationships with third parties within the organization, etc. The specific similarities and distinctions on which to make such adjustments, as well as the quantifications of the adjustments themselves, are variable design parameters.

As with tracked interest levels, the level of granularity, internal format and default initialization values used for similarity levels are variable design parameters. Like interest levels, similarity levels between users 303 and user types are also used during the filtration of event notifications 311 as described below. It is to be understood that the specific format in which both static and dynamic user profile information 309 is maintained and stored is a variable design parameter. In different embodiments, different databases, data structures and/or or other suitable storage mechanisms can be used in this capacity as desired. It is to be understood that whereas a user's dynamically maintained levels of similarity to other users 303 and levels of interest in various files 313 are described herein as being part of a user's profile information 309, they need not be stored with or in the same format as the more static user profile elements, such as user id, job title, geo-location, group membership, etc. For example, in one embodiment similarity levels are maintained in a user-to-user similarity matrix, interest levels in a user-to-file interest matrix and the so called static elements in a database. Thus, the term "user profile information" 309 is used herein in a broad sense, to encompass information concerning users 303 that can be utilized in the filtering of event notifications 311.

In order to dynamically update user profile information 309, the user profile information maintaining module 307 can monitor actions taken by users 303 directed towards the files 313 of the shared data set 305. For example, accessing a file 313 indicates a certain level of interest therein, with some types of access indicating more interest than others (e.g., reading a file 313 is typically less indicative of interest therein than writing to the file 313, and being the original creator of the file 313 shows a greater interest still). Frequency, duration and extent of access are also factors. For example, accessing the same file 313 fifty times in a three day period is more indicative of interest than twice in a month. Likewise, making extensive substantive edits to the file 313 is more indicative of interest than correcting a single typographical error. Making extensive comments concerning a file 313 is also indicative of interest therein. The exact extent of interest indicated by specific activities and how it is quantified in updates made to the interest levels can vary between embodiments.

In addition to updating a specific user's profile information in response to that user's own actions directed at files 313 of the shared data set 305, the specific user's interest level in different files 313 can also be updated in response to actions indicative of interest taken by other users 303, provided that the other user 303 taking the action is quantified as being sufficiently similar to the user 303 whose profile information 309 is being updated. For example, if a first user's similarity level to a second user 303 is sufficient (i.e., above a given threshold), it can be assumed that the first user 303 will be interested in files 313 (and/or types of files, file content, etc.) in which the second user 303 is interested. This logic can also be applied at the level of user types as well as individual users 303. That is to say, an individual user's interest level can be adjusted based on actions of other users 303 of a given type, as well as other individual users 303, so long as the similarity level exceeds a given predetermined threshold. Likewise, the interest levels of all users 303 of a given type can be adjusted based on the actions of an individual users 303, provided that sufficient similarity criteria are met.

How much to increase a user's interest level in a given file 313 based on actions of one or more other users 303 is a variable design parameter, which can be a function not only of the action taken but also of but the level of similarity between the users 303 and/or user types. Typically, actions taken by similar users 303 are less indicative of interest than actions taken by a given user 303 him or herself, and the lower the level of similarity the less indicative such actions taken by others are. How specifically to quantify these factors when updating a user's interest level can vary between embodiments. Additionally, the specific threshold value of similarity between users 303 and/or user types which must be exceeded to adjust one user's interest level based on the actions of another is a variable design parameter which can be adjusted up and down as desired.

In addition to monitoring actions directed at files 313 of the shared data set 305, how users 303 respond to (and otherwise act towards) notifications 311 of events received within the context of the file sharing and collaboration environment 301 can be monitored and used to update user interest levels. For example, if a user 303 ignores a notification 311, it is indicative of the user 303 not being interested in the shared data 305 targeted thereby, whereas if the user clicks on the notification 311 and drills down to examine the referenced data 305 the opposite would be the case. More specifically, suppose a first user 303 receives a notification 311 that a second user 303 edited a given file 313. If the user 303 that received the notification 311 clicks through and examines the edit, it can be inferred that the user is interested in the file 313 (and/or the file type or content of the edit). On the other hand, if the user deletes the received notification 311, a lack of interest is indicated. Likewise, user actions directed at comments made by other users 303 concerning given files 313 and edits made thereto are also indicative of interest levels, and thus can also be monitored and used to dynamically adjust corresponding user profile information 309.

As described above in the context of monitored actions that access files 313 of the shared data set 305, how much to adjust a user's interest level in a given unit of shared data 305 based on the user's own actions concerning notifications 311 and/or comments is a variable design parameter, as is the extent to which to adjust these levels in response to such actions taken to similar users 303, as well as the specific similarity thresholds to apply. In general, the direct and indirect actions of users 303 that are indicative of their interest concerning shared data 305 can be monitored, and machine learning techniques can be applied to dynamically update interest levels of both the user 303 taking an action and sufficiently similar users 303 in realtime, in response to the monitored actions.

In addition to dynamically updating user interest levels, quantifications of similarity levels between users can also be dynamically updated based on the monitored actions. More specifically, when separate users 303 each take an action indicative of interest in the same specific unit of shared data 305 (e.g., file 313, file type, file content including comment, etc.), the similarity level between the users 303 can be increased. Exactly how much to increase this quantification based on which specific action directed at which specific units of shared data 305 varies between embodiments, and can be weighted based on factors such as the nature of the action, the proximity in time between the separately executed actions by the given users 303, the number of times the users 303 separately access the target data 305, the frequency at which multiple accesses occur, properties of the users 303 themselves, etc. As with interest levels, the internal format used to represent similarity levels, as well as their initial default value, are variable design parameters.

The monitoring of actions targeting shared data 305 can be implemented by intercepting or otherwise hooking system calls that perform the corresponding access functionality. The monitoring can be performed at the server 105 level where the collaboration event notification filtration system 101 and file sharing and collaboration environment 301 run and the shared data 305 itself resides, or at the client 103 level from which the user's actions originate. The exact functionality to monitor, and hence the specific system calls to intercept, can vary between embodiments. The implementation mechanics of system call interception varies between operating systems. For example, under Windows interception can be implemented by using dynamic link library (DLL) injection or a kernel level filter driver. Under iOS interceptions occur at runtime. Under Android, code is disassembled, modified, added to, and re-assembled.

In addition to dynamically updating user profile information 309 quantifying user interest and similarity levels based on monitored actions, users 303 can enter and edit information specifying data in which they are interested, and users 303 with whom they are associated. Such entries can then be used by the user profile information maintaining module 307 to automatically set and/or adjust corresponding interest levels as appropriate. For example, a particular user 303 can indicate that s/he is interested in all documents in a given project, describing a specific topic, edited by a specific user 303, etc.

In a manner similar to the user profile information maintaining module 307, a file profile information maintaining module 315 of the collaboration event notification filtration system 101 maintains file profile information 317 concerning each file 313 of the shared data set 305. In addition to file profile information concerning individual files 313, file profile information 317 can also be maintained at higher or lower levels of granularity as desired. The file profile information maintaining module 315 can maintain file profile information concerning specific files 313, file types and specific file subsections, such as content added by user edits, comments made by users 303, etc.

File profile information 317 describes the file 313 (or supersection and/or subsection thereof), and can include tags, categorization information such as projects to which the file 313 belongs and metadata such as name, owner, access permissions, etc. It is to be understood that some of the file profile information 317 describing files 313 can be in the form of information maintained by the file sharing and collaboration environment 301 (e.g., tags, collaborative access history, project and group inclusion information, etc.) and by the file system (e.g., file name, access permissions, extension, etc.). Where this is the case, the file profile information maintaining module 315 communicates with these entities to access this information as desired. The specific descriptive file profile information 317 to maintain, as well as what components external to the collaboration event notification filtration system 101 maintain which elements thereof, can vary between embodiments.

In addition to the above-described profile information 317 which can be thought of as describing a file 313 (or super/subsection thereof), the file profile information maintaining module 315 also maintains similarity levels quantifying each file's similarity to other specific files 313, file types and file content. To do so, the file profile information maintaining module 315 applies natural language processing techniques to the files 313, in order to analyze their content and learn similarities between them. Different natural language processing techniques are used in this capacity in different embodiments. In response to the natural language processing indicating that two files 313 have a requisite amount of content in common, the corresponding similarity level is increased. The granularity level at which to analyze the content, what specific common content is considered indicative of similarity, different weights to assign to different content items in calculating similarity levels, as well as requisite frequency, at what positions relative to other content, in which portions of files 313 and other factors concerning what and how much of the common content occurring where are considered how indicative of similarity, are all variable design parameters.

In one embodiment, n-gram analysis is applied to the files 313, and in response to a determination that a requisite number of n-grams occur in multiple files 313 with a requisite spatial and/or temporal frequency, the similarity level of the files 313 is increased. As the term is used herein, an "n-gram" is a contiguous sequence of n items from a given sequence of content (in this case, the file content being analyzed). The items can be phonemes, syllables, letters, words or phrases. An n-gram of size one is called a unigram, size two a bigram, size three a trigram and sizes larger than three are generally referred to by the value of n, e.g., four-gram, five-gram, etc. In other embodiments, other forms of natural language processing can be applied to identify commonality between files 313, such as automatic summarization, named entity recognition, natural language understanding, relationship extraction, topic segmentation, topic recognition, word sense disambiguation, optical character recognition, machine translation, parts-of-speech tagging, stemming and text simplification.

Similarity ratings can also be adjusted based on files 313 having requisite amounts of given types of metadata and/or descriptive profile information in common, such as common ownership, edit histories, inclusion in common projects, being accessed or owned by similar types of users 303, etc. It is to be understood that similarities can be quantified not only between files 313 but also between file types and file content, including the content of deltas and comments.

Within the context of the file sharing and collaboration environment 301, events occur (e.g., files 303 are created, files 303 are edited, comments are made, files 313 and users 303 are added to and removed from groups and projects, etc.). As events occur, the file sharing and collaboration environment 301 generates event notifications 311. Rather than allow the notifications 311 to be transmitted to users 303 indiscriminately, which as described above overwhelms the users 303 and causes the notifications 311 to be ignored, a filtering module 319 of the collaboration event notification filtration system 101 filters the event notification stream. Each time the file sharing and collaboration environment 301 generates an event notification 311, the event notification 311 is filtered by the filtering module 319, so that the notification is only transmitted to those users 303 adjudicated as being sufficiently likely to be interested therein.

More specifically, each event notification 311 describes an event (e.g., an action such as accessing, editing or commenting on a file 313) undertaken by a specific user 303, and directed towards a specific file 313 of the shared set 305. Therefore, in order to determine which users 303 would be interested in which notifications 311, a relevance value quantifying module 321 of the collaboration event notification filtration system 101 quantifies a relevance value 323 of the event notification 311, for each specific one of the multiple users 303. In other words, rather than simply broadcast the event notification 311, each user 303 is treated as a potential target for the notification 311, and a separate relevance value 323 is calculated for each specific user 303, in order to quantify the statistical likelihood of the specific user being interested in the notification 311.

The relevance value quantifying module 321 calculates the relevance value 323 for a given target user 303 based on user profile information 309 concerning the specific target user 303, file profile information 317 concerning the file 313 to which the event is directed, and user profile information 309 concerning the user who undertook the event. An event notification transmitting module 325 of the collaboration event notification filtration system 101 then transmits each filtered event notification only to those users for whom the relevance value 323 exceeds a given, predetermined threshold. As with other thresholds discussed above, the specific threshold to be exceeded by a relevance value 323 for an event notification 311 to be transmitted to a given user 303 is a variable design parameter which can be adjusted up and down as desired.

Many different factors can be taken into account in the quantification of a relevance value 323 of an event notification 311 for a specific user 303. One example is the interest level of the target user 303 in the file 313 (or file type or file content) to which the event is directed. The relevance value 323 of an event notification 311 for a target user 303 can thus be adjusted in proportion to the target user's interest level in the file 313, file type and/or file content in question. As discussed above, the quantification of this interest level is included in the user profile information 309. The higher the user's interest level in the given file 313 which is being acted upon by the event, the more relevant the notification of the event is adjudicated as being to the target user 303. This is so for the user's interest in the file per se, in the type of file in question, as well as in content of the file, such as content in the body of the file 313, content in a modification made to the file 313 by a user 303, content in a comment made by a user 303 concerning the file 313 and metadata of the file 303.

Another factor that can be taken into account in quantifying the relevance value 323 for a specific target user 303 is the similarity level, as quantified in the user profile information, of the target user 303 (or a user type to which the target user 303 belongs) to the user 303 who undertook the event of the notification 311 (or to a user type to which the user 303 who undertook the event belongs). In other words, the more similar the user 303 who undertook the event in question is quantified as being to the target user 303, the more relevant the notification of the event is adjudicated as being to the target user 303, and thus the corresponding relevance value 323 for the target user 303 is increased accordingly. This similarity between users 303 can be at the level of individual users 303 and/or at the user type level, as described above.

In some embodiments, the collaboration event notification filtration system 101 maintains a general relevance value for each of the multiple users 303 that have access to the shared data set 305. The general relevance value of a specific user 303 quantifies a general interest level of other users 303 in events undertaken by the specific user 303. In such embodiments, when quantifying the relevance value 323 of an event notification 311 to a specific target user 303, the general relevance value of the user 303 who undertook the event can be taken into account. In other words, the higher the general interest value of the user 303 who undertook a given event, the more statistically likely it is that other users 303 would be interested in a corresponding event notification 311, and thus the relevance value 323 of the event notification 311 can be adjusted proportionality, for every target user 303.

In order to quantify the general relevance value of a specific user 303, the collaboration event notification filtration system 101 can monitor actions taken by other users 303 directed towards received notifications 311 of events undertaken by the specific user 303, towards content added to files 313 of the shared set 305 by the specific user 303 and to comments made by the specific user 303 (e.g., comments made concerning files 313 of the shared set 305). If other users 303 select, click through to, drill down on or otherwise retrieve or examine content underlying event notifications 311, comments and/or edits made by a specific user 303, it is indicative of interest. On the other hand, deleting or ignoring these items indicates a lack of interest. Therefore, the general relevance value of the specific user 303 can be dynamically adjusted in response to monitored actions, such that the general relevance value is increased in response to a monitored action indicating interest and the general relevance value is decreased in response to a monitored action indicating a lack of interest. How much to adjust the general relevance value of the user in response to which actions is a variable design parameter, and can include factors such as the specific action taken, the user 303 who took the action, the frequency with which the same or similar actions are taken, the number or percentage of users 303 taking the same or similar actions, etc.

In some embodiments, in addition to (or instead of) a general relevance value for each user 303, the collaboration event notification filtration system 101 determines a general relevance value for each specific event that is described by an event notification 311. In other words, when an event notification 311 is filtered, a corresponding general relevance value is determined for the event in question. A general relevance value for an event quantifies an interest level of users 303 in the specific event, based on factors such as the event type, the file 313 targeted by the event, the user 303 who undertook the event, the time of event, one or more comments made by users 303 concerning the event, etc. The relevance value 323 of a notification 311 of the specific event can then be adjusted for target users 303 in proportion to the general relevance value of the specific event (i.e., adjusted up or down as appropriate based on the event's general relevance value).

As noted above, different factors can be taken into account in determining the general relevance value for a specific event. For example, where the event is in the form of a file access, the type of access can be taken into account, with a write operation typically being considered more generally relevant than a read operation. This is so because more users 303 tend to be affected by a change made to a file than by the mere viewing of its contents. The time of the access can also be a factor, with recent access operations typically being considered more relevant than older ones, as quantified for example by applying the exponential decay model. The user 303 that undertook the action as well as the target file 313 can also be factors in determining an event's general relevance value.

The substantiality of an edit or a comment can also be a factor in determining the general relevance value of an event. More specifically, in one embodiment, when an event results in the generation of new file content (e.g., a user writes new content to a file or makes a new comment), the new file content is parsed and natural language processing is applied, in order to quantify a substantiality level of the new content. For example, the words of the new content can be stemmed, and minor words that are not indicative of substantive additions (e.g., words such as "the", "and", "to", "he" and other articles, conjunctions, prepositions, pronouns, particles and such) can be ignored. These and other natural language processing techniques can be applied to distinguish between minor edits such as those merely correcting grammatical or typographical errors and the like, and major, substantive edits or comments. Minor changes are typically of less relevance than more substantive ones, such as edits in which a requisite number or type of words are modified or added. Thus, the substantiality level of the new file content can be quantified accordingly, and the general relevance value of the corresponding event can be adjusted up or down in proportion thereto.

In addition to a general relevance value, the relevance of an event (as opposed to a corresponding event notification 311) can also be determined for specific users 303. For example, any events involving edits made to a given file 313 may be considered highly relevant to the user 303 that created or has ownership of the file 313, even if the events are not of interest to other users 303 and have a low general relevance level. Event relevance can also be determined regarding user types. For example, events targeting .mpp files associated with a given set of projects could be classified as being of high relevance to project managers but not to other users 303.

In some embodiments, the collaboration event notification filtration system 101 maintains a general relevance value for each specific file 313 of the shared set 305. This value quantifies a general interest level of users 303 in events targeting the specific file 303. The general relevance level of a specific file 313 can be adjusted based on users 303 showing interest or lack thereof in the specific file 313 over time. Actions indicative of this type of interest can be monitored. Examples include actions directed towards received notifications 311 of events targeting the specific file 313, actions directed towards content of the specific file 313 (including actions directed towards content added to the specific file 313 and towards comments made by users 303 concerning the specific file 313).

The general relevance value of the file 313 can be dynamically adjusted up and down in response to these monitored actions. In other words, the general relevance value is increased in response to a monitored action indicating interest in the file 313, and decreased in response to a monitored action indicating a lack of interest therein. For example, if users 303 drill down to file content underlying a given event notification 311, it is indicative of interest in the file 313, and thus the file's general relevance value is increased in response. On the other hand, if users 303 ignore notifications 311 describing events targeting a given file 313, it indicates a lack of interest and thus the file's general relevance value is decreased. In embodiments in which a general relevance value is maintained for files 313, when quantifying the relevance value 323 of an event notification 311 for a specific target user 303, the general relevance value of the file 313 targeted by the event in question can also be taken into account.

A wide variety of factors are described above which can be utilized in the quantification of the relevance value 323 of specific event notifications 311 to specific users 303. It is to be understood that which of these factors to apply, the combinations in which to apply them, and the weights to give to different ones of the factors can vary between embodiments as desired. In other words, some or all of the above-described factors can be applied in any desired combination with any desired weighting in different embodiments.

Figure 4:
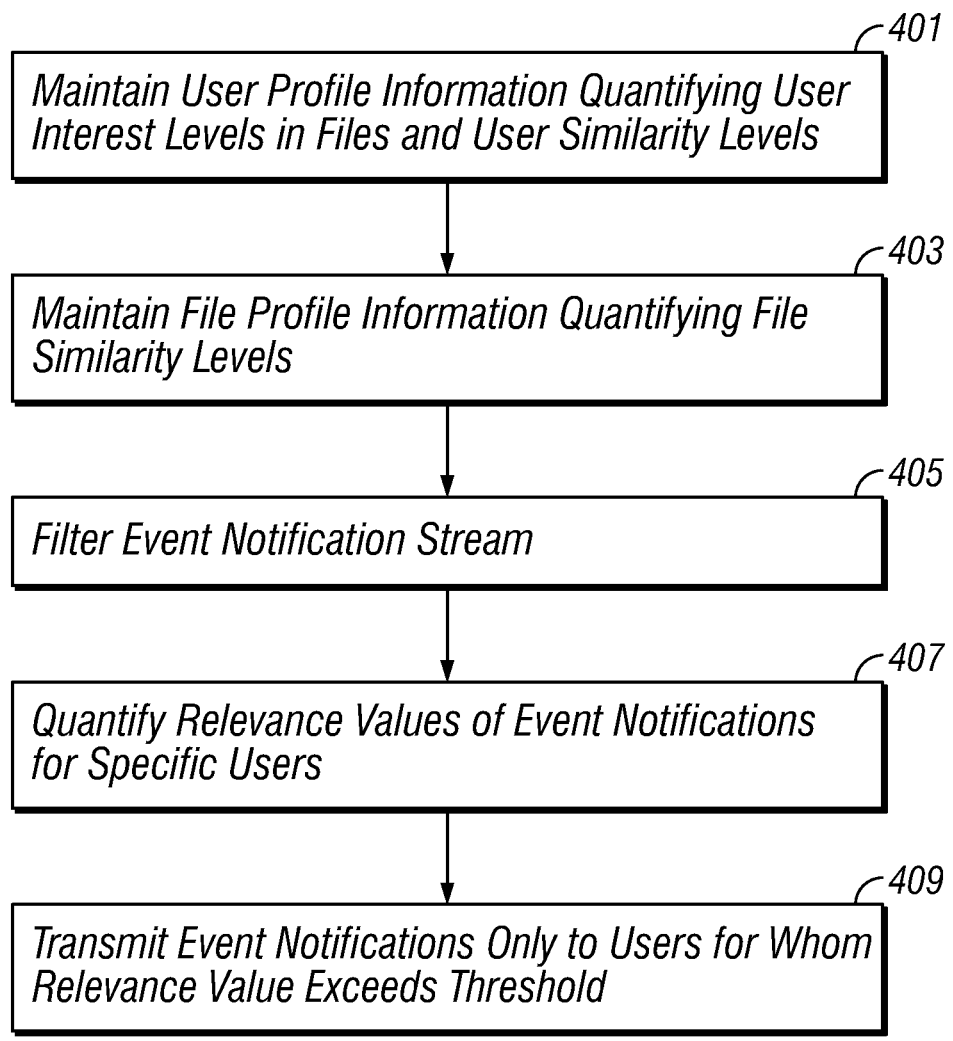
FIG. 4 is a flowchart of the operation of a collaboration event notification filtration system, according to some embodiments.

FIG. 4 illustrates steps of the operation of a collaboration event notification filtration system 101, according to some embodiments. The user profile information maintaining module 307 maintains 401 user profile information 309 concerning each one of the multiple users 303 of the file sharing and collaboration environment 301, quantifying the interest level of the user 303 in specific files 313, specific file types and specific file content, and quantifying the similarity level of the user 303 to other specific users 303 and to specific user types. The file profile information maintaining module 315 maintains 403 file profile information concerning 317 each file 313 of the shared set 305, quantifying a similarity level of the file 313 to other specific files 313, specific file types and specific file content. The filtering module 319 filters 405 the event notification stream of the file sharing and collaboration environment 301, which comprises a plurality of notifications 311, each describing an event undertaken by a user 303 and directed towards a file 313. The relevance value quantifying module 321 quantifies 407 a relevance value 323 of each specific event notification 311 for each specific user 303, based on user profile information 309 concerning the specific user 303, file profile information 317 concerning the file 313 to which the event is directed, and user profile information 309 concerning the user 303 who undertook the event. The event notification transmitting module 325 transmits 409 event notifications 311 only to those specific users 303 for whom the corresponding relevance value 323 exceeds a predetermined threshold, thereby preventing users 303 from being flooded with event notifications 311 in which they are not interested.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for filtering an event notification stream based on relevance to specific targets in a distributed file sharing and collaboration environment in which multiple users collaboratively view, modify and comment on a shared set of files, the method comprising the steps of:
   maintaining, by a computer, dynamic and static profile information concerning each one of the multiple users, wherein user profile information concerning a user describes the user and quantifies an interest level of the user in specific files, specific types of files and specific file content of the shared set, and quantifies a similarity level of the user to other specific users and to specific types of users;
   maintaining, by the computer, file profile information concerning each file of the shared set, wherein file profile information concerning a file describes the file and quantifies a similarity level of the file to other specific files, specific types of files and specific file content of the shared set;
   filtering the event notification stream of the file sharing and collaboration environment, by the computer, wherein the event notification stream comprises a plurality of notifications, each notification describing an event undertaken by a user and directed towards a file of the shared set;
   for each specific event notification in the filtered event notification stream, quantifying a relevance value, by the computer, for each specific one of the multiple users, based on user profile information concerning the specific user, file profile information concerning the file to which the event is directed, and user profile information concerning the user who undertook the event; and
   transmitting, by the computer, a notification describing the specific event only to those specific users for whom the relevance value exceeds a predetermined threshold value.

2. The method of claim 1 further comprising:
   monitoring actions taken by specific ones of the multiple users directed towards files of the shared set and towards received notifications of events of the file sharing and collaboration environment; and dynamically updating user profile information, based on applying machine learning techniques to the monitored actions.

3. The method of claim 2 wherein dynamically updating user profile information further comprises:

dynamically updating user profile information to increase a quantification of a first user's interest level in a specific file, in a specific type of file, in specific file content or in a specific event, based on a second user taking an action indicative of interest in the specific file, specific type of file, specific file content or specific event, wherein a quantification of similarity of the first user to the second user exceeds a threshold value.

4. The method of claim 2 wherein dynamically updating user profile information further comprises:

dynamically updating user profile information to decrease a quantification of a first user's interest level in a specific file, in a specific type of file, in specific file content or in a specific event, based on a second user taking an action indicative of a lack of interest in the specific file, specific type of file, specific file content or specific event, wherein a quantification of similarity of the first user to the second user exceeds a threshold value.

5. The method of claim 2 wherein dynamically updating user profile information further comprises:

dynamically updating user profile information to increase a quantification of similarity level of a first user to a second user, based on the first user and the second user each separately taking an action indicative of interest in a common specific file, in a common specific file type, in common specific file content or in a common specific event.

6. The method of claim 1 further comprising:

applying natural language processing to files in the shared set; and increasing a quantification of a first file's similarity level to a second file, responsive to the applied natural language processing indicating that the first file and the second file have a requisite amount of common content.

7. The method of claim 6 wherein:

applying natural language processing to files in the shared set further comprises performing n-gram analysis on content of the files; and the applied natural language processing indicating that the first file and the second file have a requisite amount of common content further comprises determining that a requisite number of common n-grams occur in both the first file and in the second file with a requisite frequency.

8. The method of claim 1 further comprising:

increasing a quantification of a first file's similarity level to a second file, responsive to the first file and the second file both having a requisite amount of common metadata.

9. The method of claim 1 wherein file content further comprises at least one of:

content in a body of a file and content in a comment concerning a file.

10. The method of claim 1 wherein quantifying a relevance value of an event notification for a specific user further comprises:

adjusting a relevance value of an event notification for a target user in proportion to a quantification, in the user profile information, of the similarity level of 1) the target user or a user type of the target user to 2) the user who undertook the event or a user type of the user who undertook the event.

11. The method of claim 1 wherein quantifying a relevance value of an event notification for a specific user further comprises:

adjusting a relevance value of an event notification for a target user in proportion to a quantification, in the user profile information concerning the target user, of the target user's interest level in the file to which the event is directed, in a file type of the file to which the event is directed or in content of the file to which the event is directed.

12. The method of claim 11 wherein content of the file further comprises at least one of:

content in a body of the file, content in a modification made to the file by a user, content in a comment made by a user concerning the file and metadata of the file.

13. The method of claim 1 further comprising:

maintaining a general relevance value for each one of the multiple users, wherein a general relevance value for a user quantifies an interest level of other users in events undertaken by the specific user; and wherein quantifying a relevance value of an event notification for a user further comprises adjusting a relevance value of an event notification for a target user in proportion to the general relevance value of the user who undertook the event.

14. The method of claim 13 further comprising:

monitoring actions taken by users directed towards received notifications of events undertaken by a specific user, towards file content added to files of the shared set by the specific user and to comments made concerning files of the shared set by the specific user; and dynamically adjusting the general relevance value of the specific user in response to monitored actions, wherein the general relevance value is increased in response to a monitored action indicating interest and the general relevance value is decreased in response to a monitored action indicating a lack of interest.

15. The method of claim 1 wherein quantifying a relevance value of a specific event notification further comprises:

determining a general relevance value for the specific event, wherein the general relevance value quantifies an interest level of users in the specific event based on at least one of: a type of the specific event, a time of the specific event, a target file of the specific event, a user who undertook the specific event and a comment made by a user concerning the specific event;

adjusting the relevance value of the specific event notification for a target user in proportion to the 1:3 general relevance value of the specific event.

16. The method of claim 15 wherein determining the general relevance value for the specific event further comprises:

parsing file content generated by the user undertaking the specific event, wherein the file content consists of at least one from a group consisting of: content added to a target file during the course of the specific event and content entered as a comment concerning the target file during the course of the specific event;

applying natural language processing to the file content;

quantifying a substantiality level of the file content in response to results of the applied natural language processing; and adjusting the general relevance value of the specific event in proportion to the quantified substantiality level of the file content.

17. The method of claim 1 further comprises:
  maintaining a general relevance value for each file of the shared set, wherein a general relevance value for a specific file quantifies an interest level of users in events targeting the specific file; and
  wherein quantifying a relevance value of an event notification for a user further comprises adjusting a relevance value of an event notification for a target user in proportion to the general relevance value of the file targeted by the event.

18. The method of claim 17 further comprising:
  monitoring actions taken by users directed towards received notifications of events targeting the specific file, towards file content of the specific file, towards file content added to the specific file and towards comments made by users concerning the specific file; and
  dynamically adjusting the general relevance value of the specific file in response to monitored actions, wherein the general relevance value is increased in response to a monitored action indicating interest and the general relevance value is decreased in response to a monitored action indicating a lack of interest.

19. At least one non-transitory computer readable-storage medium for filtering an event notification stream based on relevance to specific targets in a distributed file sharing and collaboration environment in which multiple users collaboratively view, modify and comment on a shared set of files, the at least one non-transitory computer readable-storage medium storing computer executable instructions that, when loaded into computer memory and executed by at least one processor of a computing device, cause the computing device to perform the following steps:
  maintaining dynamic and static profile information concerning each one of the multiple users, wherein user profile information concerning a user describes the user and quantifies an interest level of the user in specific files, specific types of files and specific file content of the shared set, and quantifies a similarity level of the user to other specific users and to specific types of users;
  maintaining profile information concerning each file of the shared set, wherein file profile information concerning a file describes the file and quantifies a similarity level of the file to other specific files, specific types of files and specific file content of the shared set;
  filtering the event notification stream of the file sharing and collaboration environment, wherein the event notification stream comprises a plurality of notifications, each notification describing an event undertaken by a user and directed towards a file of the shared set;
  for each specific event notification in the filtered event notification stream, quantifying a relevance value for each specific one of the multiple users, based on user profile information concerning the specific user, file profile information concerning the file to which the event is directed, and user profile information concerning the user who undertook the event; and
  transmitting a notification describing the specific event only to those specific users for whom the relevance value exceeds a predetermined threshold value.

20. A computer system for filtering an event notification stream based on relevance to specific targets in a distributed file sharing and collaboration environment in which multiple users collaboratively view, modify and comment on a shared set of files, the computer system comprising:
  at least one processor;
  system memory;
  a user profile information maintaining module residing in the system memory, the user profile information maintaining module being programmed to maintain dynamic and static profile information concerning each one of the multiple users, wherein user profile information concerning a user describes the user and quantifies an interest level of the user in specific files, specific types of files and specific file content of the shared set, and quantifies a similarity level of the user to other specific users and to specific types of users;
  a file profile information maintaining module residing in the system memory, the file profile information maintaining module being programmed to maintain profile information concerning each file of the shared set, wherein file profile information concerning a file describes the file and quantifies a similarity level of the file to other specific files, specific types of files and specific file content of the shared set;
  a filtering module residing in the system memory, the filtering module being programmed to filter the event notification stream of the file sharing and collaboration environment, wherein the event notification stream comprises a plurality of notifications, each notification describing an event undertaken by a user and directed towards a file of the shared set;
  a relevance value quantifying module residing in the system memory, the relevance value quantifying module being programmed to quantify, for each specific event notification in the filtered event notification stream, a relevance value for each specific one of the multiple users, based on user profile information concerning the specific user, file profile information concerning the file to which the event is directed, and user profile information concerning the user who undertook the event; and
  an event notification transmitting module residing in the system memory, the event notification transmitting module being programmed to transmit a notification describing the specific event only to those specific users for whom the relevance value exceeds a predetermined threshold value.

* * * * *